April 28, 1925.  
J. R. WELCH  
1,535,274  
PROCESS OF MOLDING AND APPARATUS THEREFOR  
Filed April 23, 1923  
2 Sheets-Sheet 1
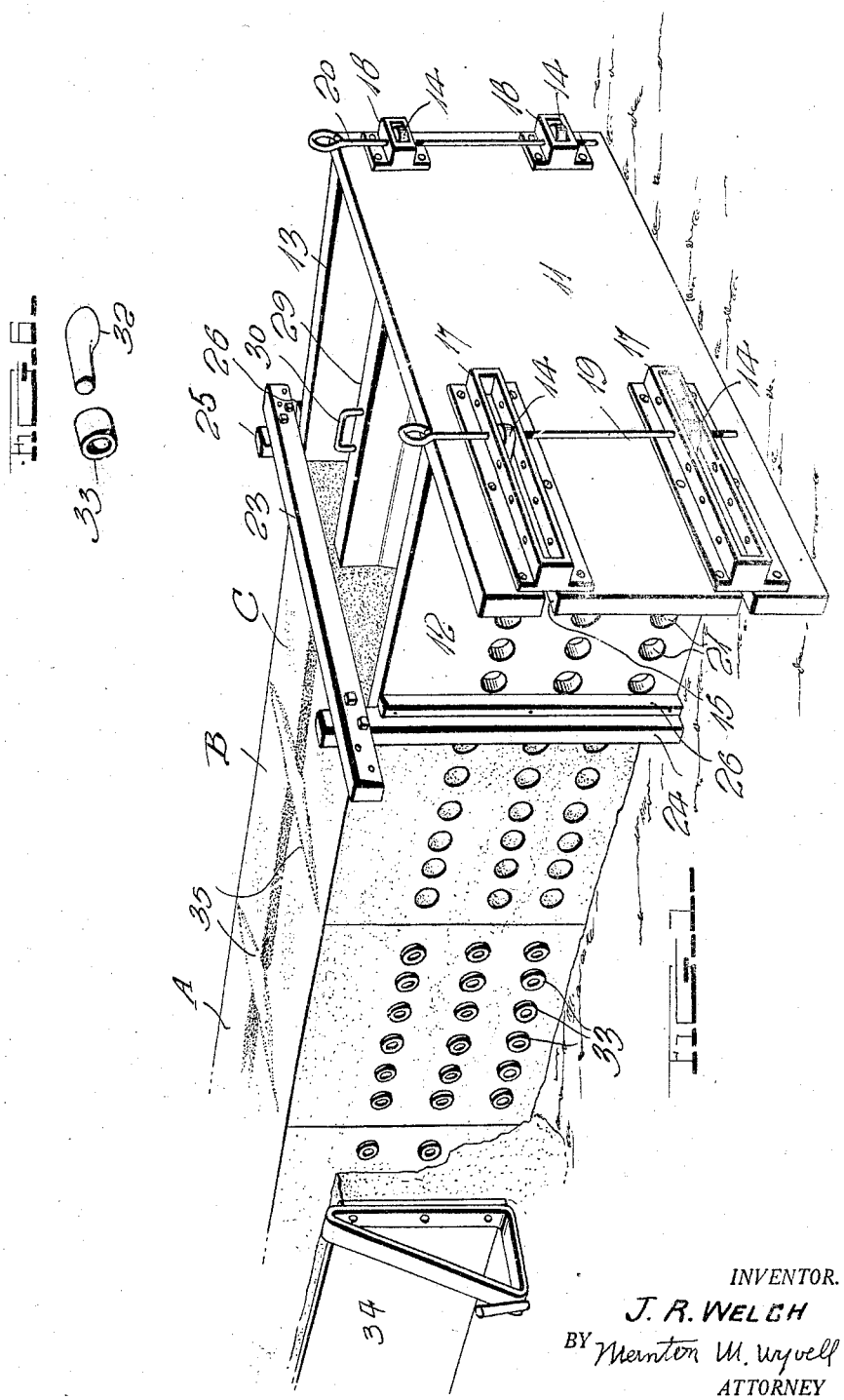
INVENTOR.  
J. R. WELCH  
BY Menton M. Wyvell  
ATTORNEY

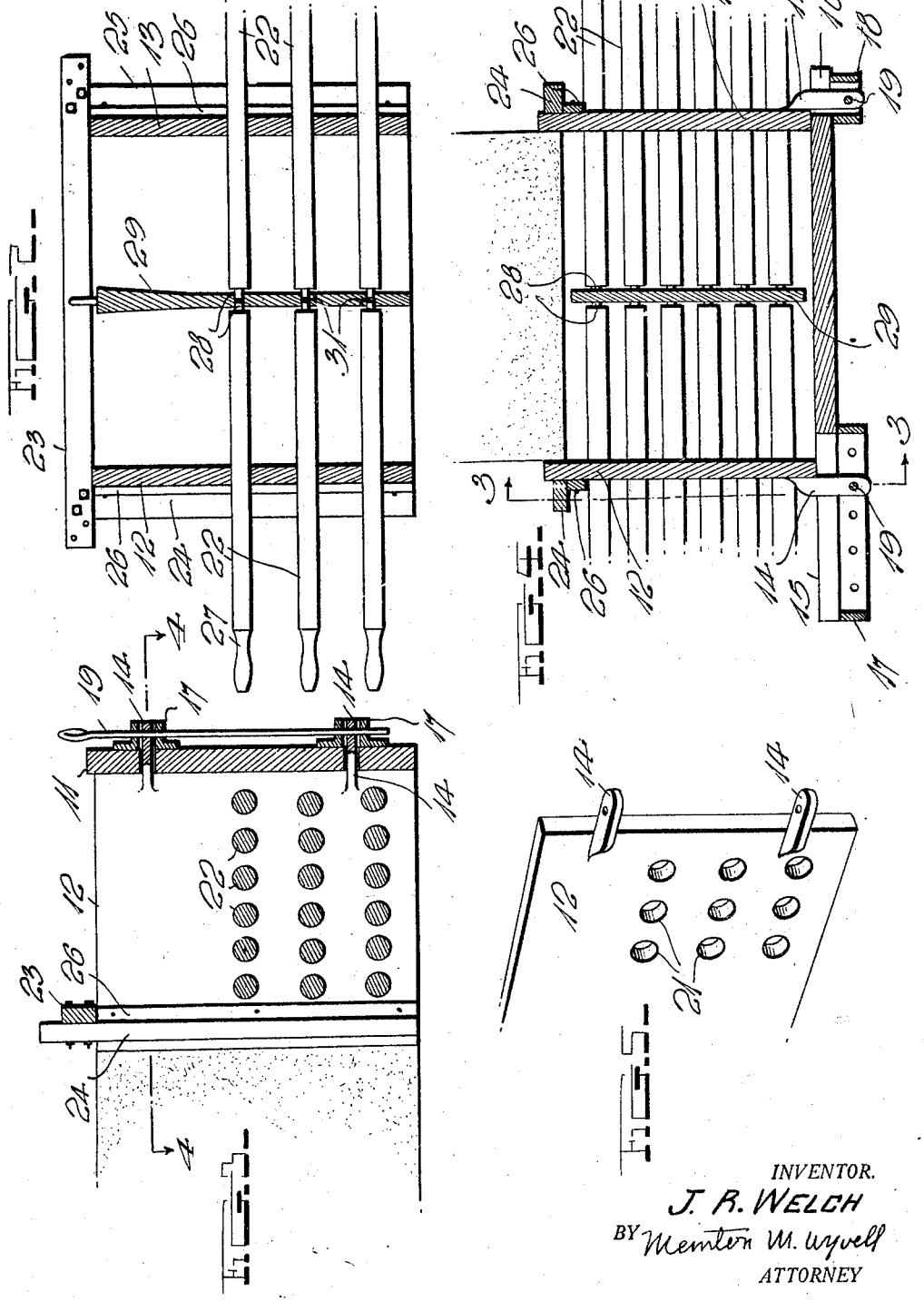

Patented Apr. 28, 1925.

1,535,274

UNITED STATES PATENT OFFICE.

JAMES R. WELCH, OF ROANOKE, VIRGINIA.

PROCESS OF MOLDING AND APPARATUS THEREFOR.

Application filed April 23, 1923. Serial No. 634,012.

*To all whom it may concern:*

Be it known that I, JAMES R. WELCH, a citizen of the United States, residing at Roanoke, in the county of Roanoke and State of Virginia, have invented certain new and useful Improvements in Processes of Molding and Apparatus Therefor, of which the following is a specification.

This invention relates to the art of molding and more particularly to a process of preparing molds in series and apparatus for carrying out such process.

One of the objects of the invention is to provide apparatus used for rapidly forming a series of molds, and which, even when of large size, can be handled by one man without assistance, and will thus be economical in time and labor. Other objects are to provide for a maximum number of castings in a given area and to facilitate the pouring of metal into a number of molds.

Still further objects of the invention and features of novelty will be apparent from the following specification when taken together with the accompanying drawings, in which:—

Fig. 1 is a view in perspective showing a flask embodying my invention, a number of molds being shown, as formed by my process, and the flask being in position for forming the next mold.

Fig. 2 is a view in vertical longitudinal section of the flask shown in Fig. 1.

Fig. 3 is a view in vertical transverse section of the flask shown in Fig. 1, taken on line 3—3 of Fig. 4.

Fig. 4 is a view in horizontal section, taken on line 4—4 of Fig. 3.

Fig. 5 is a view in perspective of one of the end members of the flask shown in Fig. 1, and Fig. 6 is a detail view in perspective of the chills used as shown in Fig. 1.

The invention is herein illustrated and described as adapted for use in casting sash-weights, which it is usually desired to cast of various lengths, but it will be apparent that the apparatus and process may be utilized for casting many other articles.

As shown in Figs. 1 to 4, the flask embodying my invention is formed with a side member 11, to which end members 12 and 13 are pivoted, thus forming a three-quarters snap flask. The end members 12 and 13 are provided with offset lugs 14 which extend from the outer sides thereof and beyond the ends of such members, as shown in Fig. 5, these lugs being adapted to project through openings 15 and 16 in the side member 11, and to be pivotally secured to hinge members 17 or 18, by pins 19 or 20, which extend through openings in the lugs and hinge members. The hinge members 17 and 18 are secured to the side member 11, adjacent the openings 15 and 16, in any suitable manner, and those provided at at least one end of the side member 11 are preferably elongated and provided with a series of openings to receive the hinge pin, thus providing for varying the distance between the end members 12 and 13 to vary the length of the articles to be cast. Each of the end members is formed with a plurality of superposed rows of openings 21 to receive the patterns 22, and a clamp is provided to hold the swinging ends of the end members in position, such clamp preferably comprising a horizontal portion 23 and end portions 24 and 25 rigidly secured thereto, by bolts 26 or in any other suitable manner. One or both of the end portions 24 and 25 should be adjustable along the horizontal portion 23, as shown, to correspond with the adjustments of the end members 12 and 13 of the flask, and cleats 26 may be provided on the end members 12 and 13 to facilitate positioning of the clamp.

The patterns 22, which in this embodiment are round, are each provided at one end with a handle 27, and at the other end with a pin or projection 28. A gate pattern 29, bearing a handle 30, is provided to extend transversely of the flask as shown in Fig. 1, and is formed with superposed rows of holes 31, corresponding in position with the openings 21 in the end portions of the flask, and adapted to receive the pins 28.

In order to shape the end of the sash-weights to receive a cord, chills 32 and plugs 33, as shown in detail in Fig. 6, are provided in sufficient number, this type of chill having a reduced end adapted to be received in an opening in the plug and the plug being of the same cross-section as the patterns 22.

The method of forming the molds is shown in Fig. 1. Any suitable wall, such as a pile of sand or other suitable backing material, is used as the fourth wall in forming the first mold, and the flask may be positioned against such pile of material, or such pile of material may be built up adjacent the flask as it is filled up. In forming each succeeding mold the flask is so positioned that the ends of end members 12 and 13 slightly overlap the end walls of the preceding mold, the side wall of such preceding mold being utilized as the fourth wall of the flask in forming the mold. When the flask is properly positioned, the clamp is put in place, after which the gate pattern 29 is positioned where desired, it being evident that it must be midway between the end walls 12 and 13 if the castings are to be all of equal length. The patterns 22 are then inserted in the openings 21, with the pins 28 projecting into the holes 31 in the gate pattern, after which the flask is filled with sand, which is carefully tamped, and the patterns 22, and then gate pattern 29, are withdrawn. The clamp may then be removed and the end members 12 and 13 may be swung away from the ends of the mold and, with the side members 11, be moved to position for the next mold, leaving the mold just formed in the condition of the mold indicated as C in Fig. 1. The chills 32, assembled with their plugs 33, are now placed in the openings formed by the patterns 22, as shown in the mold indicated as B in Fig. 1, and before casting the whole row of molds is "backed up" on each side by securing boards 34 adjacent the ends of the molds, as shown in Fig. 1, in any manner desired, and filling in with stad between such boards and the ends of the molds. The gate pattern 29 is of such length as to leave a substantial wall between the gate opening of one mold and that of the next mold, its length, as shown in Fig. 1, being somewhat less than the distance from the side member 11 to the wall of the preceding mold, and the top surfaces of the molds are finished to incline down toward the gate openings, each gate opening being separated from that of the preceding mold by a low partition wall 35.

The ends of the end members 12 and 13, which are pivoted to the side member 11, engage the side member to limit their swinging movement toward each other, thus lessening the danger of injuring the preceding mold when the flask and the clamp are being positioned for the next mold. It will be apparent that, as described, a continuous horizontal series of molds may be formed, which will occupy a minimum of space, and that the metal may be poured as a continuous process, without wasting metal between molds. It will also be evident that the molder can without a helper quickly remove the flask and position it for forming the next mold, and that, since the walls of the flask can all be moved bodily away from the mold, there is no danger of injuring the mold.

Having thus described my invention, it will be understood that changes may be made in various details of the process and of structure without departing from the spirit of the invention which is defined in the following claims.

The invention having been thus described, what is claimed is:—

1. A molding flask consisting of a side member, and two end members extending in the same direction from said side member and held in substantially parallel relation, with an unobstructed opening between their outer ends adapted to receive backing material.

2. A molding flask comprising a main member, a pair of end members extending from one side of said main member and pivoted thereto, and means for holding said end members in substantially parallel relation, the opening between the free ends of said end members being unobstructed and adapted to receive backing material.

3. A molding flask comprising a main member, an end member secured to said main member adjacent one end thereof, a second end member pivotally secured to said main member adjacent the other end thereof, said main member and said second end member having abutments cooperating to limit relative swinging movement when they are in substantially perpendicular relation to each other, and means for holding said end members in substantially parallel relation, with the opening between their free ends unobstructed.

4. A molding flask comprising a main member, an end member secured to said main member adjacent one end thereof, a second end member pivoted to said main member adjacent the other end thereof, one of said end members having a pattern receiving opening, and means for holding said end members in substantially parallel relation with the opening between their free ends unobstructed.

5. A molding flask comprising a main member, an end member extending from one side thereof, a second end member adapted to be pivotally secured to said main member at various distances from said first end member, and means for holding said end members in substantially parallel relation.

6. A molding flask comprising three plates, the end plates being pivotally secured to the middle plate and having pattern receiving openings therein, and means outside of the contour of the flask for holding said end plates in substantially parallel relation.

7. A molding flask comprising a main member, and a pair of end members extending from one side of said main member, one of said end members having a pattern receiving opening therein, and the opening between the free ends of said end members opposite said main member being unobstructed.

8. A molding flask comprising a main member, a pair of end members pivoted to said main member, abutments on said main member and said end members cooperating to limit relative swinging movement when said end members are substantially parallel, and means for holding said end members in parallel relation.

9. In the art of molding, the process of forming a plurality of molds in a continuous horizontal series by utilizing a wall of each mold as a wall of the form for preparing the next succeeding mold.

10. In the art of molding, the process of forming a plurality of molds in a continuous horizontal series by forming each successive mold in contact with the preceding mold.

11. In the art of molding, the process of preparing a plurality of molds in a continuous series by positioning an open-sided form to receive the mold and with a portion of the preceding mold embraced in the open side of such form.

12. In the art of molding, the process of preparing a plurality of molds in a continuous series, which comprises positioning an open sided form to receive the mold, forming such mold, moving said form along, and forming another mold in the space bounded by the walls of said form and the end wall of the preceding mold.

In testimony whereof I affix my signature.

JAMES R. WELCH.